US012128427B2

(12) United States Patent
Hagqvist et al.

(10) Patent No.: US 12,128,427 B2
(45) Date of Patent: Oct. 29, 2024

(54) METHOD OF CONTROLLING CENTRIFUGAL SEPARATOR AND CENTRIFUGAL SEPARATOR

(71) Applicant: Alfa Laval Corporate AB, Lund (SE)

(72) Inventors: Peter Hagqvist, Stockholm (SE); Carl Häggmark, Täby (SE)

(73) Assignee: ALFA LAVAL CORPORATE AB, Lund (SE)

( * ) Notice: Subject to any disclaimer, the term of this patent is extended or adjusted under 35 U.S.C. 154(b) by 666 days.

(21) Appl. No.: 17/431,809

(22) PCT Filed: Feb. 5, 2020

(86) PCT No.: PCT/EP2020/052847
§ 371 (c)(1),
(2) Date: Aug. 18, 2021

(87) PCT Pub. No.: WO2020/169343
PCT Pub. Date: Aug. 27, 2020

(65) Prior Publication Data
US 2022/0134358 A1 May 5, 2022

(30) Foreign Application Priority Data
Feb. 19, 2019 (EP) .................................... 19157919

(51) Int. Cl.
*B04B 9/10* (2006.01)
*B04B 1/08* (2006.01)
(Continued)

(52) U.S. Cl.
CPC .................. *B04B 9/10* (2013.01); *B04B 1/08* (2013.01); *B04B 11/02* (2013.01); *B04B 13/00* (2013.01)

(58) Field of Classification Search
CPC .. B04B 9/10; B04B 1/08; B04B 11/02; B04B 13/00
See application file for complete search history.

(56) References Cited

U.S. PATENT DOCUMENTS 4,755,165 A 7/1988 Gunnewig
5,171,206 A 12/1992 Marque
(Continued)

FOREIGN PATENT DOCUMENTS

CN 102612411 A * 7/2012 ........... B04B 1/2016
CN 107530716 A 1/2018
(Continued)

OTHER PUBLICATIONS

English translation of the Chinese Office Action and Search Report for Chinese Application No. 202080029600.4, dated Oct. 25, 2022.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A centrifugal separator and a method of controlling a centrifugal separator are disclosed. The centrifugal separator includes a separator rotor delimiting a separation space. At least one tube extends from at least one radially outer portion of the separation space towards a central portion of the separator rotor. The method includes inter alia changing a rotational speed of the separator rotor from a first rotational speed to a second rotational speed, such that a heavy phase accumulation at a periphery of the separation space is displaced in a circumferential direction.

19 Claims, 6 Drawing Sheets

(51) Int. Cl.
*B04B 11/02* (2006.01)
*B04B 13/00* (2006.01)

(56) References Cited

U.S. PATENT DOCUMENTS

| | | | |
|---|---|---|---|
| 5,370,599 | A | 12/1994 | Marque et al. |
| 6,248,053 | B1 | 6/2001 | Ehnström et al. |
| 6,907,375 | B2 | 6/2005 | Guggari et al. |
| 7,081,082 | B2 | 7/2006 | Scholz et al. |
| 8,298,128 | B2 | 10/2012 | Lee et al. |

FOREIGN PATENT DOCUMENTS

| | | | | | |
|---|---|---|---|---|---|
| DE | 34 09 068 | A1 | | 9/1985 | |
| EP | 1 136 131 | B1 | | 1/2006 | |
| EP | 3 287 193 | A1 | | 2/2018 | |
| EP | 3 287 194 | A1 | | 2/2018 | |
| GB | 853733 | | | 11/1960 | |
| GB | 1238718 | A | | 6/1971 | |
| GB | 8303291 | | | 3/1983 | |
| GB | 2185425 | A | * | 7/1987 | .............. B04B 1/08 |
| JP | 3-293045 | A | | 12/1991 | |
| JP | 3894651 | B2 | | 3/2007 | |
| WO | WO 2011/053224 | A1 | | 5/2011 | |
| WO | WO 2011/093784 | A1 | | 8/2011 | |
| WO | WO 2016/170091 | A1 | | 10/2016 | |

OTHER PUBLICATIONS

International Search Report, issued in PCT/EP2020/052847, dated May 7, 2020.
Written Opinion of the International Searching Authority, issued in PCT/EP2020/052847, dated May 7, 2020.
New Zealand Office Action for New Zealand No. 778726, dated May 26, 2023.

* cited by examiner

METHOD OF CONTROLLING CENTRIFUGAL SEPARATOR AND CENTRIFUGAL SEPARATOR

TECHNICAL FIELD

The present invention relates to a method of controlling a centrifugal separator. The present invention further relates to a centrifugal separator.

BACKGROUND

WO 2011/093784 discloses a centrifugal system wherein PID controllers are utilised for controlling various parameters such as recirculation flow and backpressure. A separator bowl of a centrifugal separator is also disclosed. Inside the separator bowl a liquid mixture is separated into a heavy component and a light component. The separator bowl is provided with outlet pipes for the heavy component. The outlet pipes follow an interior wall of the separator bowl and extend upwardly towards, and connect to, a heavy component outlet channel.

GB 853733 discloses a centrifuge apparatus for separating liquid material into heavy, light and intermediate fractions. Liquid material is supplied to a separator rotor. Heavy fraction is discharged through nozzles. The light fraction passes through liner plates, which herein are referred to as discs, inside the rotor and is discharged by a skimming device. The intermediate fraction passes from outside the liner plates through tubes and passages. The heavy fraction is partly recircuit via a return passage into the rotor. A valve controls the discharge of intermediate fraction. Moreover, water may be added to the rotor via the return passage for further controlling the flow of intermediate fraction.

A centrifugal separator comprises a separator rotor delimiting a separation space. As exemplified in the above-mentioned documents, such a centrifugal separator may comprise at least one tube extending from a radially outer portion of the separation space towards a central portion of the separation space. A separated heavy phase is conducted via the at least one tube out of the separator rotor. The provision of the at least one tube provides for the heavy phase to be transported out of the separator rotor in a gentle manner, compared to if the heavy phase is ejected from a periphery of the separator rotor. The gentle treatment may be advantageous e.g. when the heavy phase comprises living matter, such as e.g. yeast, or other cells. Gentle treatment may also be advantageous when separating active substances for the manufacturing of pharmaceutical drugs.

Depending on the number of tubes, and/or the internal diameter of the tubes, and/or the properties of the heavy phase, there may be one or more problems with a separator comprising the above discussed at least one tube. The heavy phase may block one or more of the tubes. Only part of the heavy phase may leave the separator rotor via the tubes. Some of the heavy phase may instead remain in some sectors of the radially outer portion of the separation space, such as in a sector where a tube is blocked, or in a sector where there is no tube.

SUMMARY

It is an object to remedy, or at least alleviate, at least some of the above-mentioned problems. It would be advantageous to provide a method of controlling a centrifugal separator such that a heavy phase flows reliably out of a separator rotor of the centrifugal separator via at least one tube. Accordingly, there is provided a method as defined in an appended independent method claim related to a method of controlling a centrifugal separator. Further, it would be advantageous to provide a centrifugal separator devised such that a heavy phase flows reliably out of a separator rotor of the centrifugal separator via at least one tube. Accordingly, there is provided a centrifugal separator as defined in an appended independent claim related to a centrifugal separator.

According to an aspect, there is provided a method of controlling a centrifugal separator. The centrifugal separator comprises a separator rotor delimiting a separation space, a stack of frustoconical separation discs arranged inside the separation space, a drive arrangement configured to rotate the separator rotor about a rotation axis at a rotational speed, an inlet for a liquid mixture, a first outlet for a light liquid phase arranged in fluid communication with a central portion of the separation space, a second outlet for a heavy phase, and at least one tube extending from at least one radially outer portion of the separation space towards a central portion of the separator rotor. The at least one tube has an outer end arranged at the at least one radially outer portion and an inner end arranged towards the central portion of the separator rotor. The second outlet is arranged in fluid communication with the inner end of the at least one tube. The method comprises steps of:

- rotating the separator rotor at a first rotational speed,
- providing a liquid mixture to the inlet,
- separating the liquid mixture into at least a light liquid phase and a heavy phase in the separation space,
- leading the light liquid phase to the first outlet,
- leading the heavy phase through the at least one tube from the outer end to the second outlet, and
- changing the rotational speed of the separator rotor from the first rotational speed to a second rotational speed, such that a heavy phase accumulation at a periphery of the separation space is displaced in a circumferential direction.

Since, the rotational speed of the separator rotor is changed from the first rotational speed to the second rotational speed, such that a heavy phase accumulation at the periphery of the separation space is displaced in a circumferential direction, it may be ensured that the heavy phase accumulation at the periphery is displaced towards the outer end of the at least one tube. Thus, the heavy phase accumulated within the separation space at circumferential positions where there is no tube, is displaced such that the heavy phase is able to flow out of the separation space via the at least one tube. As a result, the above-mentioned object is achieved.

According to a further aspect, there is provided a centrifugal separator comprising: a separator rotor delimiting a separation space, a stack of frustoconical separation discs arranged inside the separation space, a drive arrangement configured to rotate the separator rotor about a rotation axis at a rotational speed, an inlet for a liquid mixture, a first outlet for a light liquid phase arranged in fluid communication with a central portion of the separation space, a second outlet for a heavy phase, at least one tube extending from at least one radially outer portion of the separation space towards a central portion of the separator rotor, and a controller configured to control the drive arrangement. The at least one tube has an outer end arranged at the at least one radially outer portion and an inner end arranged towards the central portion of the separator rotor. The second outlet is arranged in fluid communication with the inner end of the at least one tube. The controller is configured to control the drive arrangement to rotate the separator rotor at a first rotational speed and at a second rotational speed, and the controller is configured to change the rotational speed of the separator rotor from the first rotational speed to the second rotational speed.

Since the controller is configured to control the drive arrangement to rotate the separator rotor at the first rotational speed and at the second rotational speed, and the controller is configured to change the rotational speed of the separator rotor from the first rotational speed to the second rotational speed, it may be ensured that the centrifugal separator is configured to displace a heavy phase accumulation at the periphery of the separation space in a circumferential direction towards the outer end of the at least one tube. Thus, the heavy phase accumulated within the separation space at circumferential positions where there is no tube, is displaced such that it is able to flow out of the separation space via the at least one tube. As a result, the above-mentioned object is achieved.

The centrifugal separator may also be referred to as a disc stack centrifugal separator. The centrifugal separator may be a high speed separator, i.e. a centrifugal separator wherein the separator rotor is rotated at one or more thousands of revolutions per minute (rpm). The separator rotor may also be referred to as a separator bowl.

The first and second rotational speeds are rotational speeds exceeding 0 rpm. The first and second rotational speeds may e.g. exceed 1000 rpm. The first rotational speed differs from the second rotational speed.

The first rotational speed may be higher than the second rotational speed. Thus, the change in rotational speed may be a reduction in rotational speed of the separator rotor. Alternatively, the first rotational speed may be lower than the second rotational speed. Thus, the change in rotational speed may be an increase in rotational speed of the separator rotor. In both instances, the change in rotational speed may bring about the displacement of the heavy phase accumulation at the periphery of the separation space.

The change of the rotational speed of the separator rotor from the first rotational speed to the second rotational speed brings about a rotational speed difference between the heavy phase accumulation and the separator rotor. Due to this rotational speed difference, the displacement of the heavy phase accumulation in the circumferential direction at a periphery of the separation space is achieved.

The provision of the at least one tube provides for the heavy phase to be transported out of the separator rotor in a gentle manner, compared to if the heavy phase is ejected from a periphery of the separator rotor. The gentle treatment may be advantageous e.g. when the heavy phase comprises living matter, such as e.g. yeast, or other cells. Gentle treatment may also be advantageous when separating active substances for the manufacturing of pharmaceutical drugs.

The periphery of the separation space refers to the outward bounds of the separation space, as opposed to the central and middle portions of the separation space. One or more inner surfaces of the separator rotor limit the separation space at the periphery of the separation space. The at least one at least one radially outer portion of the separation space is arranged at the periphery of the separation space.

During separation of the liquid mixture into the light liquid phase and the heavy phase, the heavy phase is collected in a circumferential portion of the separation space, at the periphery of the separation space, and forms a heavy phase accumulation. The circumferential portion extends in a circumferential direction of the separator rotor, and may thus form an imaginary ring or torus inside the separation space.

Due to the displacement in the circumferential direction of the heavy phase accumulation by the change of the rotational speed of the separator rotor from the first rotational speed to the second rotational speed, the heavy phase accumulation does not form a static mass. Namely, while the centrifugal separator is in operation, part of the heavy phase in the heavy phase accumulation leaves the separation space via the at least one tube, and new heavy phase is added to the heavy phase accumulation as heavy phase is separated from the liquid mixture.

According to embodiments, the method may comprise a step of:

changing the rotational speed of the separator rotor from the second rotational speed back to the first rotational speed. In this manner, conditions are created for again changing the rotational speed to the second rotational speed. Thus, the step of changing the rotational speed of the separator rotor from the first rotational speed to the second rotational speed may be performed again. Moreover, also in the step of changing the rotational speed of the separator rotor from the second rotational speed back to the first rotational speed, a favourable displacement of the heavy phase accumulation may be achieved. The step of changing the rotational speed of the separator rotor from the second rotational speed back to the first rotational speed need not necessarily be performed in one step, but may be performed e.g. by the rotational speed of the separator rotor changing from the second rotational speed to a third rotational speed before changing to the first rotational speed.

According to embodiments, the method may comprise a step of:

periodically repeating the step of changing the rotational speed of the separator rotor from the first rotational speed to a second rotational speed. In this manner, the heavy phase accumulation at the periphery of the separation space is intermittently displaced in a circumferential direction towards the outer end of the at least one tube. Thus, the heavy phase may be continuously lead out of the separation space via the at least one tube.

The step of periodically repeating the step of changing the rotational speed of the separator rotor from the first rotational speed to the second rotational speed may be performed in various ways. For instance, a timeframe for each repetition of periodically repeating the step of changing the rotational speed may have one and the same length for each repetition. Alternatively, a timeframe for each repetition of periodically repeating the step of changing the rotational speed may differ between at least some of the repetitions, for instance within the below discussed timeframes.

According to embodiments, the step of changing the rotational speed of the separator rotor from the first rotational speed to the second rotational speed may be performed within a timeframe of 1-60 seconds, or within a timeframe of 1-30 seconds, or within a timeframe of 1-20 seconds, or within a timeframe of 3-15 seconds. In this manner, the change in rotational speed may be performed within a timeframe causing displacement of the heavy phase accumulation in a circumferential direction at the periphery of the separation space.

According to embodiments, a rotational speed difference between the first rotational speed and the second rotational speed may be at least 50 rpm, or at least 100 rpm. In this manner, the magnitude of the rotational speed change may be suited to cause displacement of the heavy phase accumulation in a circumferential direction at the periphery of the separation space.

According to embodiments, the step of rotating the separator rotor at a first rotational speed may comprise a step of:

controlling the drive arrangement to rotate the separator rotor at the first rotational speed, and wherein the step of changing the rotational speed of the separator rotor from the first rotational speed to a second rotational speed may comprise a step of:

controlling the drive arrangement to rotate the separator rotor at the second rotational speed. In this manner, the rotational speed of the separator rotor may be controlled via the drive arrangement.

According to embodiments, the centrifugal separator may comprise a braking arrangement arranged separate from the drive arrangement, and configured to brake the rotational speed of the separator rotor. The step of changing the rotational speed of the separator rotor from the first rotational speed to a second rotational speed may comprise a step of:

braking the rotational speed of the separator rotor from the first rotational speed to the second rotational speed utilising the braking arrangement. In this manner, a dedicated braking arrangement may be involved in the step of changing the rotational rotor of the separator rotor. For centrifugal separators comprising larger separator rotors, using a braking arrangement may be an advantageous way of changing the rotational speed of the separator rotor rapid enough to displace the heavy phase accumulation in a circumferential direction at the periphery of the separation space.

According to embodiments, the first rotational speed, and/or the second rotational speed, may provide centrifugal separation at 1000 G or more. In this manner, an efficient separation of the liquid mixture into the light liquid phase and the heavy phase may be provided.

According to embodiments, the separator rotor may comprise one or more outlet openings at a radially outer periphery of the separator rotor, the outlet openings connecting a radially outer periphery of the separation space with an ambient environment of the separator rotor. The method may comprise a step of:

intermittently opening the outlet openings. In this manner, sludge accumulated at the radially outer periphery of the separation space may be prevented by the intermittent ejection of sludge. Moreover, the intermittent opening of the outlet openings may clear out a blocked tube of the at least one tube. The sludge may comprise the heavy phase.

According to embodiments, the at least one tube may have an inner diameter within a range of 1.5-10 mm. In this manner, a suitable flow speed of the heavy phase may be achieved in the at least one tube. Thus, the at least one tube may not block up.

According to embodiments, the method may comprise a step of:

measuring a parameter of the liquid mixture, and/or of the heavy phase, and based on a value of the parameter, performing a step of:

controlling at least one of:

a level of the first rotational speed, a level of the second rotational speed, a time period for repeating the step of changing the rotational speed of the separator rotor from the first rotational speed to the second rotational speed, a time period within which the step of changing the rotational speed of the separator rotor from the first rotational speed to the second rotational speed is performed, and a level of a rotational speed difference between the first rotational speed and the second rotational speed. In this manner, the flow of heavy phase through the at least one tube may be controlled based on a parameter of the liquid mixture or of the heavy phase. For instance, due to the step of controlling at least one of the above mentioned separator control parameters, a flow of the heavy phase from the separation space via the at least one tube may be maintained also if a parameter of the liquid mixture should change.

According to embodiments, the controller may be configured to periodically change the rotational speed of the separator rotor from the first rotational speed to the second rotational speed. In this manner, the heavy phase accumulation at the periphery of the separation space is intermittently displaced in a circumferential direction towards the outer end of the at least one tube. Thus, the heavy phase may be continuously lead out of the separation space via the at least one tube.

According to embodiments, an inner surface of the separator rotor may be provided with one or more steps along a circumferential direction of the separator rotor. In this manner, part of the heavy phase accumulation at the periphery of the separation space is collected between the steps. Thus, the rotational speed change of the separator rotor from the first rotational speed to the second rotational speed may be efficiently transferred to the heavy phase accumulation, and bring about an efficient displacement of the heavy phase accumulation along the periphery of the separation space in a circumferential direction.

According to embodiments, an inner circumferential surface portion of the separator rotor may form a volute extending in a circumferential direction of the separator rotor from a first circumferential position to a second circumferential position, and wherein the outer end of the at least one tube is arranged in the second circumferential position. In this manner, the inner peripheral surface of the separator rotor leans towards the at least one tube. Thus, the displacement of the heavy phase accumulation in a circumferential direction at the periphery of the separation space by the rotational speed change is enforced by the volute.

Further features and advantages will become apparent when studying the appended claims and the following detailed description.

BRIEF DESCRIPTION OF THE DRAWINGS

Various aspects and/or embodiments including particular features and advantages, will be readily understood from the example embodiments discussed in the following detailed description and the accompanying drawings, in which.

DETAILED DESCRIPTION

Aspects and/or embodiments will now be described more fully. Like numbers refer to like elements throughout. Well-known functions or constructions will not necessarily be described in detail for brevity and/or clarity.

Figure 1:
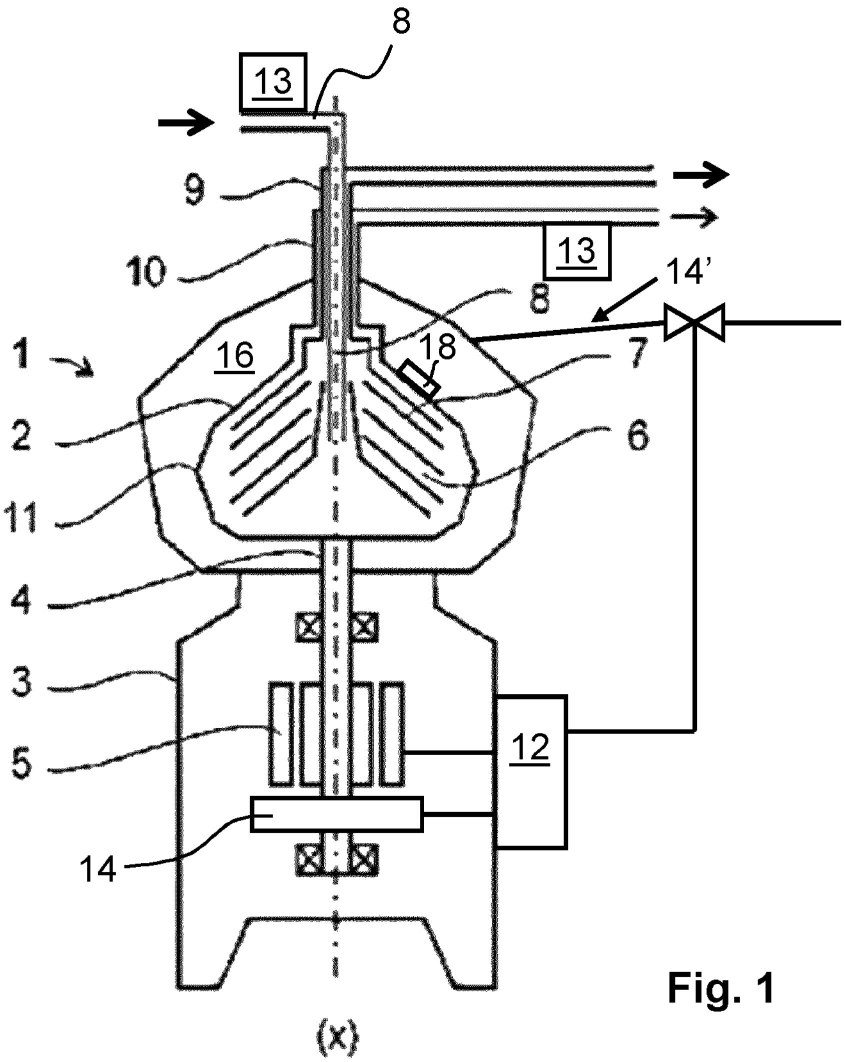
FIG. 1 schematically illustrates a cross section through a centrifugal separator according to embodiments.

FIG. 1 schematically illustrates a cross section through a centrifugal separator 1 according to embodiments. The centrifugal separator 1 comprises a rotor arrangement 2 and a drive arrangement 5. The rotor arrangement 2 comprises a separator rotor 11 and a spindle 4. The spindle 4 is supported in a housing 3 of the centrifugal separator 1, e.g. via two bearings. The housing 3 may comprise more than one individual part, i.e. the housing 3 may be assembled from several parts. The drive arrangement 5 is configured to rotate the rotor arrangement 2, i.e. the separator rotor 11 and the spindle 4, about a rotation axis (X) at a rotational speed.

In these embodiments, the drive arrangement 5 forms part of the spindle 4. That is, the rotor arrangement 2 is directly driven by the drive arrangement 5. The drive arrangement 5 comprises an electric motor and a rotor of the electric motor forms part of the spindle 4. In alternative embodiments, the drive arrangement may instead be connected to the spindle. Such alternative embodiments may comprise an electric motor connected to the spindle, e.g. via cog wheels, or a belt drive.

The separator rotor 11 delimits a separation space 6 therein. Inside the separation space 6, continuous centrifugal separation of a liquid mixture takes place during operation of the centrifugal separator 1. Inside the separation space 6 there is arranged a stack of frustoconical separation discs 7. The separation discs 7 provide for an efficient separation of the liquid mixture into at least a light phase and a heavy phase. The light phase may be a light liquid phase. The stack of frustoconical separation discs 7 is fitted centrally and coaxially with the rotation axis (X), and rotates together with the separator rotor 11.

The centrifugal separator 1 may be configured for separating the liquid mixture into at least the light phase and the heavy phase. The liquid mixture may comprise e.g. one liquid, or two liquids. The liquid mixture may comprise solid matter, which may be separated from the liquid mixture as part of the heavy phase.

The centrifugal separator 1 comprises an inlet 8 for the liquid mixture, a first outlet 9 for the light phase, and a second outlet 10 for the heavy phase. In the illustrated embodiments, the liquid mixture to be separated is fed from the top of the centrifugal separator 1 via the inlet 8 centrally down into the separator rotor 11, from which it is distributed in to the separation space 6. During use of the centrifugal separator 1, the separated light phase is lead upwardly to the first outlet 9 from a central portion of the separator space 6. That is, the first outlet 9 is arranged in fluid communication with the central portion of the separation space 6. From a central portion of the separator rotor 11, the heavy phase is lead upwardly to the second outlet 10. How the heavy phase is directed from the radially outer periphery of separation space 6 to the central portion of the separator rotor 11 is discussed in more detail with reference to FIG. 2 below.

The present invention is not limited to any particular types of liquid mixtures or separated fluid phases. Neither is the present invention limited to any particular inlet arrangement for the liquid mixture, nor to any particular first outlet 9 for the separated light phase.

The centrifugal separator 1 further comprises a controller 12 configured to control the drive arrangement 5. More specifically, the controller 12 is configured to control the electric motor of the drive arrangement 5. Such controllers are known and may operate e.g. by controlling the voltage, the current, or the frequency of the electric current supplied to the electric motor, inter alia depending on the type of electric motor. Therefore, the controller 12 will not be discussed in further detail herein.

The controller 12 is configured to control the drive arrangement 5 to rotate the separator rotor 11 at a first rotational speed and at a second rotational speed. The controller 12 may be configured to control the drive arrangement 5 in further ways. For instance, the controller 12 may be configured to start and stop the drive arrangement 5. The controller 12 may be configured to control the drive arrangement 5 to rotate the separator rotor 11 at further rotational speeds, such as at a third rotational speed.

The controller 12 is configured to control the drive arrangement 5 to accelerate the separator rotor 11 to a fixed rotational speed. Further, the controller 12 is configured to control the drive arrangement 5 at one or more fixed rotational speeds, at least for a limited time period. The fixed rotational speed or speeds may correspond to the first rotational speed and/or to the second rotational speed.

According to some embodiments, the controller 12 may be configured to dynamically brake the electric motor of the drive arrangement 5, i.e. convert the electric motor to a generator in order to brake the separator rotor 11. Thus, the controller 12 may actively brake the first rotational speed to the second rotational speed, or vice versa.

According to some embodiments, the centrifugal separator 1 may comprise a braking arrangement 14, 14' arranged separate from the drive arrangement 5, and configured to brake the rotational speed of the separator rotor 11. In such embodiments, the controller 12 may be configured to control the braking arrangement 14, 14'. The controller 12 may be configured to brake the rotational speed of the separator rotor 11 from the first rotational speed to the second rotational speed with the braking arrangement 14, 14', or vice versa.

In FIG. 1 two example embodiments of braking arrangements 14, 14' are schematically illustrated. Suitably, in practice only one of the braking arrangements 14, 14' may be provided on a centrifugal separator.

The first exemplified braking arrangement 14 comprises a ventilated disc brake. The disc of the disc brake is connected to the spindle 4. When a braking force is applied to the brake disc via brake pads, the rotational speed of the spindle 4 and the separator rotor 11 is braked, for instance from a first rotational speed to a second rotational speed.

The second braking arrangement 14' comprises a water inlet into a rotor space 16 of the housing 3. In order to brake the rotational speed of the separator rotor 11, water is flushed in sufficient amounts onto the separator rotor 11 inside the rotor space 16. The separator rotor 11 may be provided with one or more fins 18 for enhancing the braking efficiency of the water flushed onto the rotor 11.

While the braking arrangement 14, 14' is braking the separator rotor 11, the drive arrangement 5 may be switched off. Alternatively, the drive arrangement 5 may assist in the braking of the separator rotor 11 by switch to a braking mode, such as e.g. dynamic braking. When the braking arrangement 14, 14' is utilised for braking the separator rotor 11, e.g. from the first rotational speed to the second rotational speed, the drive arrangement 5 may be controlled to stabilise the rotational speed of the separator rotor 11 at the second rotational speed.

Figure 2:
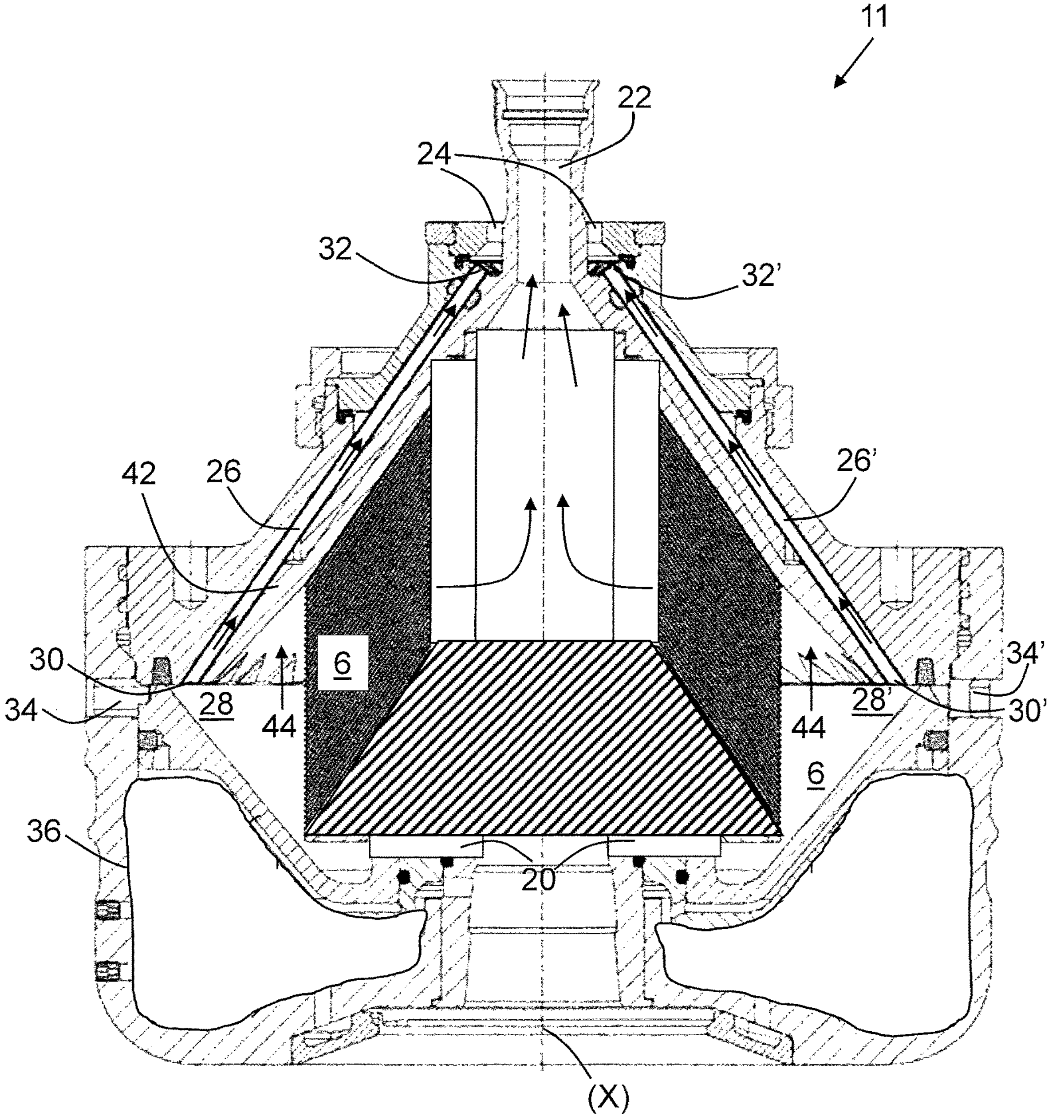
FIG. 2 illustrates a cross section through a separator rotor according to embodiments.

FIG. 2 illustrates a cross section through a separator rotor 11 according to embodiments. The separator rotor 11 is a separator rotor of a centrifugal separator, such as e.g. the centrifugal separator 1 shown in FIG. 1.

Again, the separator rotor 11 is configured to be rotated around a rotation axis (X) and delimits a separation space 6 with a stack of frustoconical separation discs 7.

In these embodiments, the liquid mixture is lead into the separation space 6 from a lower side of the separator rotor 11. Channels 20 for conducting the liquid mixture into the separation space 6 are schematically illustrated in FIG. 2. From a central portion of the separation space 6, a separated light liquid phase is lead upwardly via a first conduit 22 to a first outlet of the centrifugal separator. The flow of the light phase is indicated with arrows in FIG. 2. A separated heavy phase is lead upwardly at a central portion of the separator rotor 11 via a second conduit 24 to a second outlet of the centrifugal separator.

At least one tube 26, 26' extends from at least one radially outer portion 28, 28' of the separation space 6 towards the central portion of the separator rotor 11. The at least one tube 26, 26' has an outer end 30, 30' arranged at the at least one radially outer portion 28, 28' and an inner end 32, 32' arranged towards the central portion of the separator rotor 11 and the second conduit 24. Thus, the second outlet of the centrifugal separator is arranged in fluid communication with the inner end 32, 32' of the at least one tube 26, 26'. The at least one radially outer portion 28, 28' is arranged at at least one peripheral portion of the separation space 6.

In these embodiments, the separator rotor 11 comprises two tubes 26, 26'. In alternative embodiments, the separator rotor 11 may comprise only one tube, or more than two tubes, such as e.g. four tubes, seven tubes, ten tubes, or twelve tubes. In the following description reference will be made to only one tube 26. However, the discussion applies to any other tube of the same kind.

During separation of the liquid mixture, the separated heavy phase is collected at the peripheral portion of the separation space 6. The separated heavy phase forms a heavy phase accumulation at a periphery of the separation space 6. Via the tube 26, heavy phase from the heavy phase accumulation is conducted to the central portion of the separator rotor 11. Accordingly, the separated heavy phase is in viscous form, such that it can flow through the tube 26. A pressure difference between the radially inner end 32 of the tube 26 and the radially outer end 30 of the tube 26 promotes the flow of the heavy phase from the peripheral portion of the separation space 6 towards the central portion of the separator rotor 11. The flow of the heavy phase in the tube 26 is indicated with arrows in FIG. 2.

The tube 26 may have an inner diameter within a range of 2-10 mm. The inner diameter may be selected depending on the number of tubes 26 and on the amount and viscosity of the heavy phase. A suitable flow speed of the heavy phase in the tube 26 to prevent blockage of the at least one tube 26, 26' is pursued. Mentioned as an example, a flow speed of about 2 m/s may be suitable for some types of heavy phase.

Optionally, the separator rotor 11 may comprise one or more outlet openings 34, 34' at a radially outer periphery of the separator rotor 11. The outlet openings 34, 34' connect a radially outer periphery of the separation space 6 with an ambient environment of the separator rotor 11. The outlet openings 34, 34' may be intermittently opened. A discharge slide 36, also referred to as sliding bowl bottom, may be utilised in a known manner for opening and closing the outlet openings 34, 34'.

Inside the separator rotor 11 an insert 42 is arranged. The insert 42 is arranged radially outside the stack of separation discs 7. The at least one tube 26, 26' is secured inside the separator rotor 11 in the insert 42. An inner surface of the insert 42 forms part of an inner surface 44 of the separator rotor 11. A similar insert 42 is discussed in further detail below with reference to FIGS. 5*a*-5*c*.

Figure 3A:
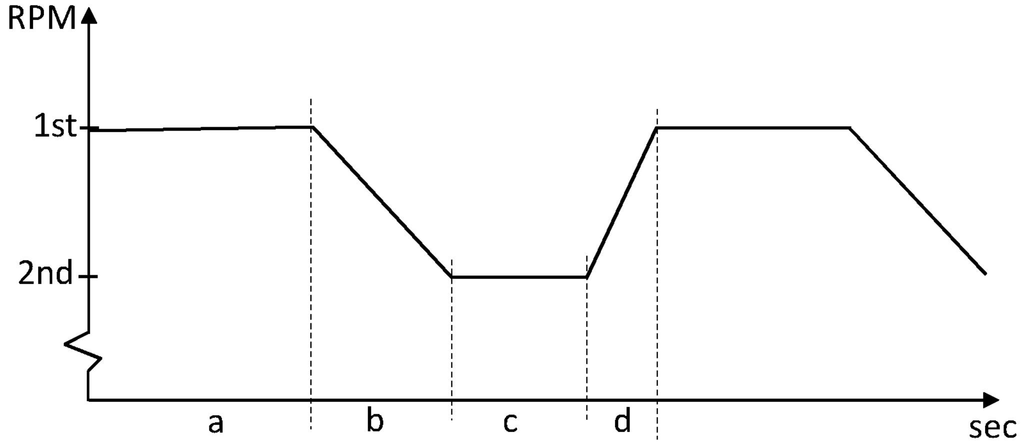
FIGS. 3*a*-3*c* illustrate diagrams of the rotational speed of a separator rotor of a centrifugal separator, according to embodiments.
Figure 3B:
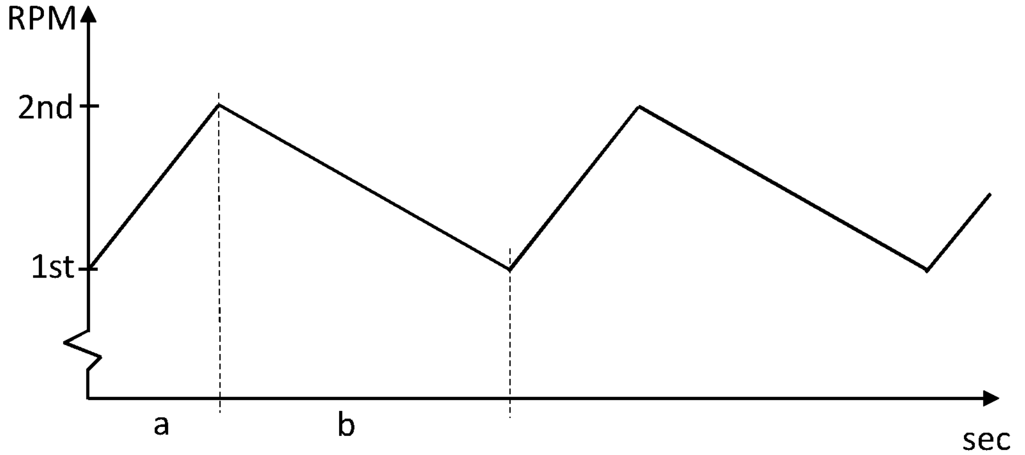
Figure 3C:
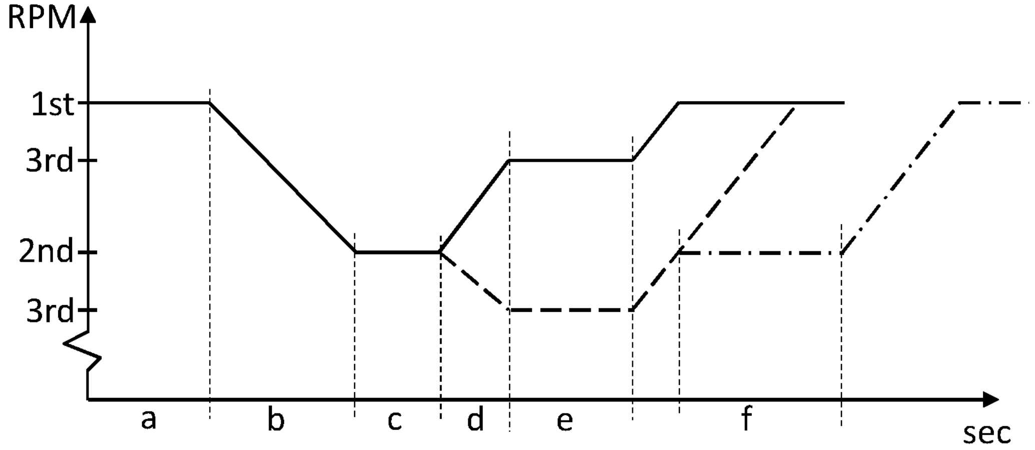

FIGS. 3*a*-3*c* illustrate diagrams of the rotational speed a separator rotor of a centrifugal separator, according to example embodiments. The centrifugal separator may be a centrifugal separator 1 as discussed with reference to FIG. 1 above. The separator rotor may be a separator rotor 11 as discussed above with reference to FIGS. 1 and 2.

Accordingly, a controller is configured to control the rotational speed of the centrifugal separator between a first rotational speed and a second rotational speed. The change in rotational speed between the first and second rotational speeds is performed in such a manner that the heavy phase accumulation at the periphery of the separation space is displaced in a circumferential direction of the separator rotor 11. Accordingly, the change in rotational speed is sudden, i.e. the change in rotational speed is performed over a limited time period. The controller of the centrifugal separator may be configured to perform one or more steps of the method 100, discussed below with reference to FIG. 6. In particular, the controller may be configured to control steps related to controlling the rotational speed of the separator rotor. Similarly, when performing the method 100, discussed below with reference to FIG. 6, the rotational speed of the separator rotor may change in accordance with at least part of the diagrams shown in FIGS. 3*a*-3*c*.

In the diagrams of FIGS. 3*a*-3*c* the rotational speed of the separator rotor (RPM) is shown over time (sec).

During operation of the centrifugal separator in accordance with the embodiments of FIG. 3*a*, the separator rotor is rotated at a constant first rotational speed, $1^{st}$. After a first time period, a, the rotational speed of the separator rotor is reduced over a second time period, b. Once the rotational speed of the separator rotor reaches the lower second rotational speed, $2^{nd}$, the separator rotor is rotated at a constant speed, at the second rotational speed, for a third time period, c. Thereafter, the rotational speed of the separator rotor is increased over a fourth time period, d, until the separator rotor reaches the first rotational speed again. This manner of changing the rotational speed of the separator rotor may be repeated one or more times. Mentioned as examples, the first and third time periods a, c may have lengths comparative to the lengths of the second and fourth time periods b, c, as shown in FIG. 3*a*. Alternative lengths of the first and third time periods may be applied, e.g. depending on the type and amount of separated heavy phase. According to one embodiment, the lengths of the second and fourth time periods b, c may be very short, i.e. the rotational speed changes substantially as soon as the first or second rotational speed is reached, as in the embodiments of FIG. 3*b*.

Operation of the centrifugal separator in accordance with the embodiments of FIG. 3*b* differs primarily from the embodiments of FIG. 3*a*, in that the separator rotor is not rotated a constant rotational speed. Instead the rotational speed of the separator rotor changes as soon as the second or first rotational speed has been reached. Although it is only a matter of nomenclature, in the embodiments of FIG. 3*b*, the first rotational speed, $1^{st}$, is the lower rotational speed, and the second rotational speed, $2^{nd}$, is the higher rotational speed.

During operation of the centrifugal separator in accordance with FIG. 3*b*, the rotational speed of the separator rotor is increased from the first rotational speed, $1^{st}$ over a first time period, a, until the second rotational speed, $2^{nd}$, is reached. Thereafter, the rotational speed of the separator rotor is decreased over a second time period, b, until the separator rotor reaches the first rotational speed, $1^{st}$. This manner of changing the rotational speed of the separator rotor may be repeated one or more times.

Operation of the centrifugal separator in accordance with the embodiments of FIG. 3*c* is more elaborate than in the embodiments of FIGS. 3*a* and 3*b*. According to these embodiments, the rotational speed of the separator rotor is maintained at a constant speed differing from the first and second rotational speeds before the rotational speed of the separator rotor again reaches the first rotational speed.

More specifically, after the rotational speed has been changed from the first rotational speed to the second rotational speed, and after the first to third time periods, a-c, have passed, the rotational speed of the separator rotor is changed to a third rotational speed, $3^{rd}$, over a fourth time period, d. The third rotational speed, $3^{rd}$, may be higher than the second rotational speed, $2^{nd}$, as indicated with the full line. Alternatively, the third rotational speed, $3^{rd}$, may be lower than the second rotational speed, $2^{nd}$, as indicated with the broken line. After a fifth time period, e, the rotational speed of the separator rotor is increased to the first rotational speed, $1^{st}$. This change may be done directly to the first rotational speed, $1^{st}$, as indicated with the full and broken lines. Alternatively, the increase to the first rotational speed may be performed via a further time period, f, during which the rotational speed is maintained at a different rotational speed, e.g. the second rotational speed, $2^{nd}$, before reaching the first rotational speed, $1^{st}$, as indicated with the dash-dotted line. According to alternative embodiments, the rotational speed changes of the separator rotor may include more than three different rotational speed levels.

Thus, with reference to FIGS. 1, 2 and 3*a*-3*c*, it may be summarised that the controller 12 is configured to change the rotational speed of the separator rotor 11 from the first rotational speed to the second rotational speed. In doing so, the heavy phase accumulation at the periphery of the separation space 6 is displaced in a circumferential direction of the separator rotor 11. Since the heavy phase flows out of the separator rotor 11 via the at least one tube 26, 26', the displacement of the heavy phase accumulation feeds the heavy phase towards the outer end 30, 30' of the at least one tube 26, 26' for further transport out of the separator rotor 11.

Suitably, the controller 12 is configured to change the rotational speed of the separator rotor 11 from the second rotational speed back to the first rotational speed. Thus, the rotational speed of the separator rotor 11 may again be changed to the second rotational speed for repeated displacement of the heavy phase accumulation.

The controller 12 may be configured to periodically change the rotational speed of the separator rotor 11 from the first rotational speed to the second rotational speed. Accordingly, the controller 12 may also be configured to periodically change the rotational speed of the separator rotor 11 back from the second rotational speed to the first rotational speed. Thus, an intermittent displacement of the heavy phase accumulation at the periphery of the separation space 6 towards the outer end of the at least one tube 26, 26' may be achieved.

Mentioned purely as examples, changing the rotational speed of the separator rotor 11 from the first rotational speed to the second rotational speed may be performed within a timeframe of 1-60 seconds, or within a timeframe of 1-30 seconds, or within a timeframe of 1-20 seconds, or within a timeframe of 3-15 seconds. The rotational speed difference between the first rotational speed and the second rotational speed may be at least 50 rpm, or at least 100 rpm.

More specific examples, with reference to FIGS. 3*a* and 3*b* may be that:

In FIG. 3*a* the second time period, b, may be 12 seconds, and the fourth time period, d, may be 6 seconds. The rotational speed difference between the first rotational speed, $1^{st}$, and the second rotational speed, $2^{nd}$, may be 250 RPM (Revolutions per Minute).

In FIG. 3*b* the first time period, a, may be 8 seconds, and the second time period, b, may be 16 seconds. The rotational speed difference between the first rotational speed, $1^{st}$, and the second rotational speed, $2^{nd}$, may be 300 RPM.

The controller 12 may further be configured for changing control parameters of the centrifugal separator 1. For instance, the controller 12 may be configured for controlling at least one of:

A level of the first rotational speed, i.e. the level of the first rotational speed may be changed.

A level of the second rotational speed, i.e. the level of the second rotational speed may be changed.

A time period for repeating a change of the rotational speed of the separator rotor from the first rotational speed to the second rotational speed.

A time period within which a change of the rotational speed of the separator rotor from the first rotational speed to the second rotational speed is performed.

A level of a rotational speed difference between the first rotational speed and the second rotational speed.

In this manner, control parameters of the centrifugal separator may be changed in order to affect e.g. the displacement of the heavy phase accumulation at the periphery of the separation space 6, and/or the flow of the heavy phase through the at least one tube 26, 26'.

The centrifugal separator 1 may be provided with one or more sensors 13 for sensing and/or measuring a parameter of the liquid mixture, and/or of the heavy phase, se FIG. 1. Sensed and/or measured data may be provided to the controller 12 for optional processing, and for basing control decisions on, such as e.g. the change of at least one of the separator control parameters discussed above.

In embodiments of the centrifugal separator 1 comprising the one or more outlet openings 34, 34' at a radially outer periphery of the separator rotor 11, the controller 12 may be configured for controlling the discharge slide 36 for intermittently opening the outlet openings 34, 34'.

Figures 4A, 4B, 4C:
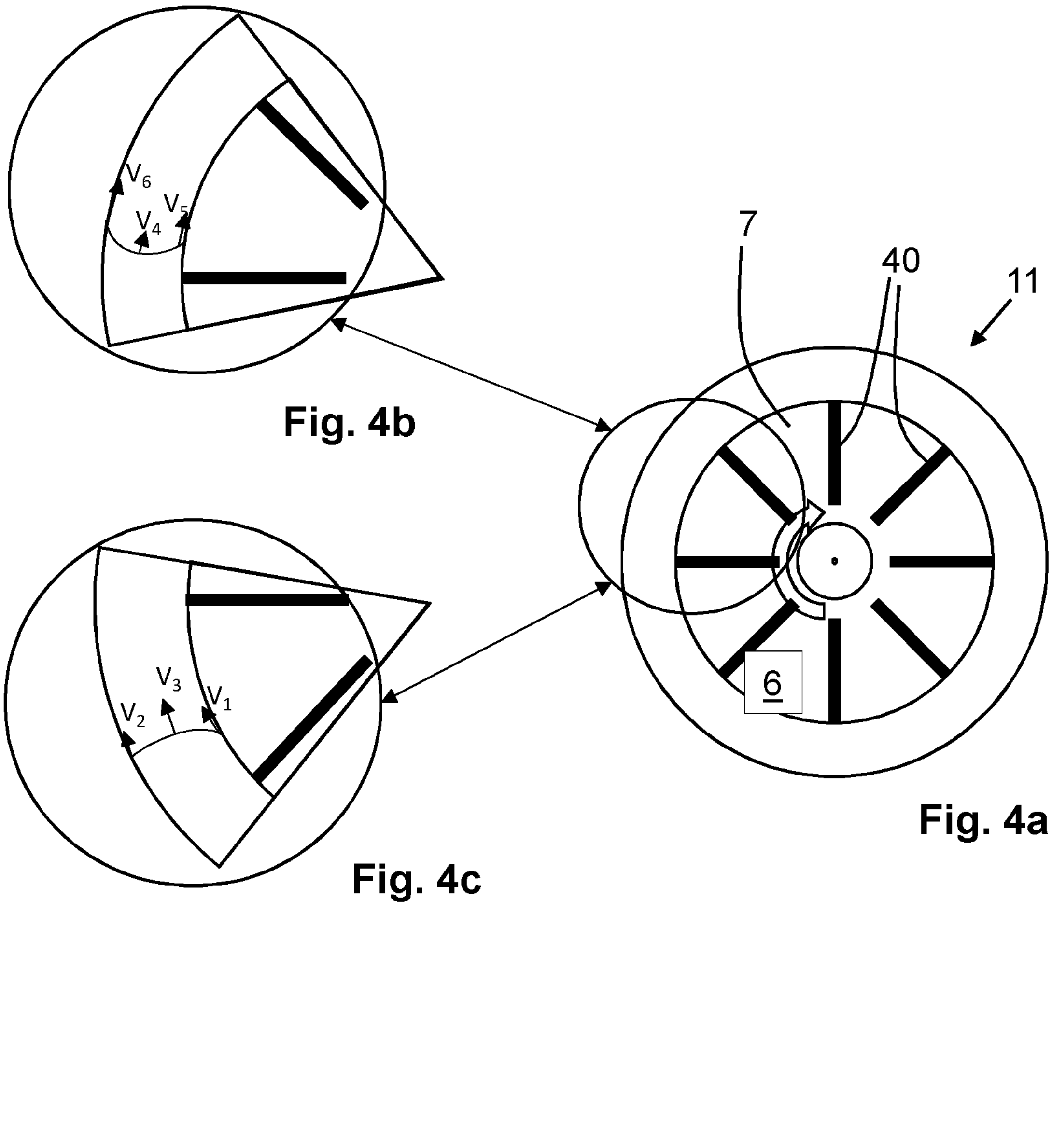
FIGS. 4*a*-4*c* illustrate the velocity of a heavy phase at the periphery of a separation space inside a separator rotor.

FIGS. 4*a*-4*c* illustrate the velocity of the heavy phase at the periphery of the separation space inside the separator rotor as the rotational speed of the separator rotor reaches the first and second rotational speeds as discussed herein. In the following, the herein mentioned circumferential displacement of the heavy phase accumulation at the periphery of the separation space in a separator rotor will be discussed with reference to FIGS. 4*a*-4*c*.

FIG. 4*a* shows a top view inside the separator rotor 11 of a centrifugal separator. One of the separation discs 7 provided with caulks 40 is visible in the separation space 6. The rotational direction of the separator rotor 11 is indicated with an arrow. During use of the centrifugal separator, the separation space is filled with liquid. Towards the centre of the separation space 6, the liquid is light liquid phase. Towards the periphery of the separation space 6, the liquid is heavy phase. In between the centre and the periphery there is a liquid mixture of the light and heavy phases. In the partial enlargements in FIGS. 4*b* and 4*c*, the velocity of the heavy phase in the space between the stack of separation discs 7 and the periphery of the separation space 6, i.e. the inner wall of the separator rotor 11, is shown.

In FIG. 4*b*, the velocity of the heavy phase is shown as the separator rotor 11 reaches the higher speed of the first and second rotational speeds of the separator rotor 11. At the stack of separation discs 7 the velocity, $V_5$, of the heavy phase is substantially that of the peripheral speed of the separation discs 7. At the inner wall of the separator rotor 11, the velocity, $V_6$, of the heavy phase is substantially that of the inner wall of the separator rotor 11. However, therebetween the velocity, $V_4$, of the heavy phase is lower due to the inertia of the heavy phase. This may be expressed as $V_4<V_5<V_6$. Due to $V_4$ being the lowest velocity, the heavy phase accumulation is displaced in relation to the separator rotor 11 in a direction against the rotational direction of the separator rotor 11.

In FIG. 4*c*, the velocity of the heavy phase is shown as the separator rotor 11 reaches the lower speed of the first and second rotational speeds of the separator rotor 11. Again, at the stack of separation discs 7 the velocity, $V_1$, of the heavy phase is substantially that of the peripheral speed of the separation discs 7. Again, at the inner wall of the separator rotor 11, the velocity, $V_2$, of the heavy phase is substantially that of the inner wall of the separator rotor 11. However, therebetween the velocity, $V_3$, of the heavy phase is higher due to the inertia of the heavy phase. This may be expressed as $V_1<V_2<V_3$. Due to $V_3$ being the highest velocity, the heavy phase accumulation is displaced in relation to the separator rotor 11 in a direction along the rotational direction of the separator rotor 11.

Thus, the displacement of the heavy phase accumulation at the periphery of the separation space in a circumferential direction is achieved as the rotational speed changes between the first and second rotational speeds.

Due to the displacement of the heavy phase accumulation at the periphery of the separation space, the heavy phase does not settle in one or more circumferential positions, where it could compact to such an extent that it cannot be transported through the at least one tube. Due to the displacement of the heavy phase accumulation at the periphery of the separation space, the heavy phase in viscous form, is moved towards the at least one tube and transported through the at least one tube. Repeated rotational speed changes as discussed herein, ensure that the displacement is repeated, and thus, the heavy phase does not settle in one or more circumferential positions.

Figure 5A:
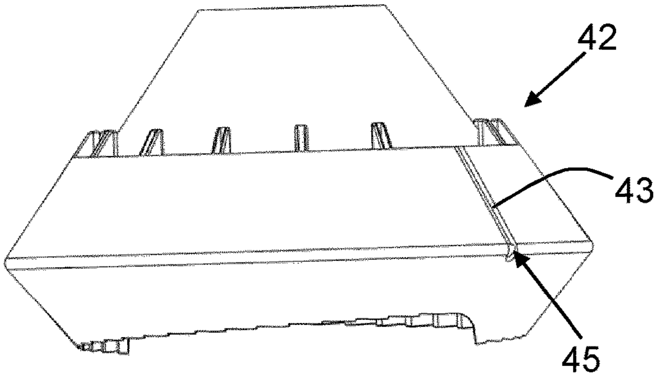
FIGS. 5*a*-5*c* illustrate various views of an insert configured for being arranged inside a separator rotor of a centrifugal separator.
Figure 5B:
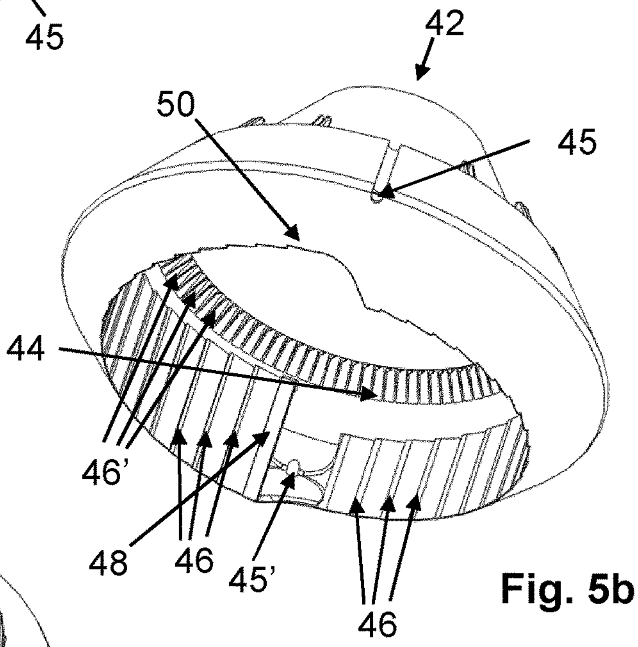
Figure 5C:
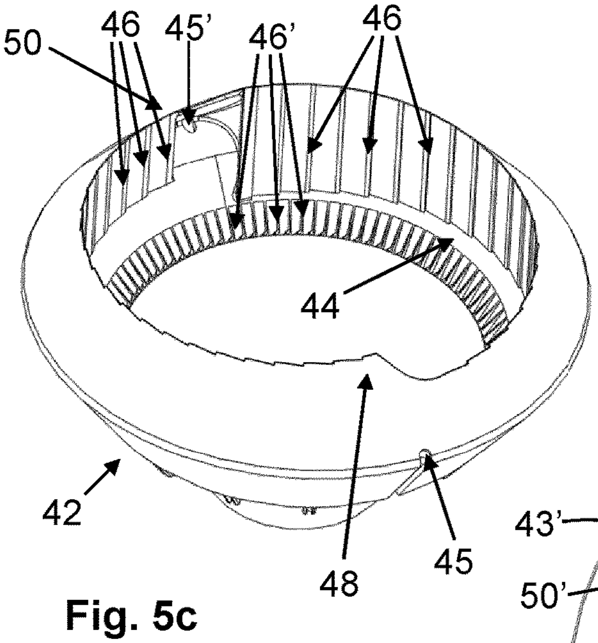

FIGS. 5*a*-5*c* illustrate various views of an insert 42 configured for being arranged inside a separator rotor of a centrifugal separator. Depending on the type of liquid mixture to be separated in the centrifugal separator, such an insert 42 may not be required. However, the use of the insert 42 may form an improvement in the separation of many types of liquid mixtures, and may even be necessary for some types of liquid mixtures. The insert 42 is arranged in a similar manner inside the separator rotor 11 as the insert 42 shown in FIG. 1.

Again, the main purpose of the insert 42 is to secure the at least one tube (not shown) inside the separator rotor. In these embodiments, the insert 42 is configured for securing two tubes. The two tubes are each secured in a slot 43, 43' at the outer surface of the insert 42. The slots 43, 43' open up towards the inside of the insert 42, via holes 45, 45'. Thus, the outer radial ends of the tubes are arranged in fluid communication with the periphery of the separation space of the separator rotor. Namely, at least part of the separation space within the separator rotor is formed within the insert 42.

The insert 42 provides at least part of an inner surface 44 of the separator rotor, which inner surface 44 is provided with one or more steps 46, 46' along a circumferential direction of the separator rotor. In these embodiments, the steps 46, 46' are provided at two axial positions of the insert 42, i.e. at two positions along a direction of the rotation axis of the separator rotor. A first set of steps 46 is arranged at an axial position of the holes 45'. A second set of steps 46' is arranged axial displace from the holes 45'. Alternatively, only one of the sets of steps 46, 46' may be provided in the insert 42.

The steps 46, 46' increase the engagement between the heavy phase accumulation and the separator rotor at the periphery of the separation space, at least in comparison with an even inner surface of the separator rotor. Thus, the steps 46, 46' assist in the displacement of the heavy phase accumulation at the periphery of the separation space as the rotational speed of the separator rotor changes.

The steps 46, 46' may be steeper in one circumferential direction than in the other circumferential direction. The steeper faces of the steps 46, 46' will engage better with the heavy phase accumulation than the less steeper faces. Thus, the effect of the rotational speed change may be increased in one circumferential direction towards the holes 45, 45' and the tubes arranged therein.

A portion of the inner circumferential surface 44 of the separator rotor may form a volute. The volute extending in a circumferential direction of the separator rotor from a first circumferential position 48 to a second circumferential position 50. The outer end of the at least one tube is arranged in the second circumferential position 50.

Herein, a direction of an extension of the volute is meant to extend from a smaller radius end of the volute towards a larger radius end of the volute. The extension of the volute is clearly visible in FIGS. 5*b*-5*d*, in particular in the bottom view of the insert 42 in FIG. 5*d*. The increasing radius of the volute promotes the movement of the heavy phase accumulation at the periphery of the separation space towards the tubes. The rotational speed change of the separator rotor together with the volute provides a particularly good movement of the heavy phase accumulation towards the tube arranged at the second circumferential position 50.

Figure 5D:
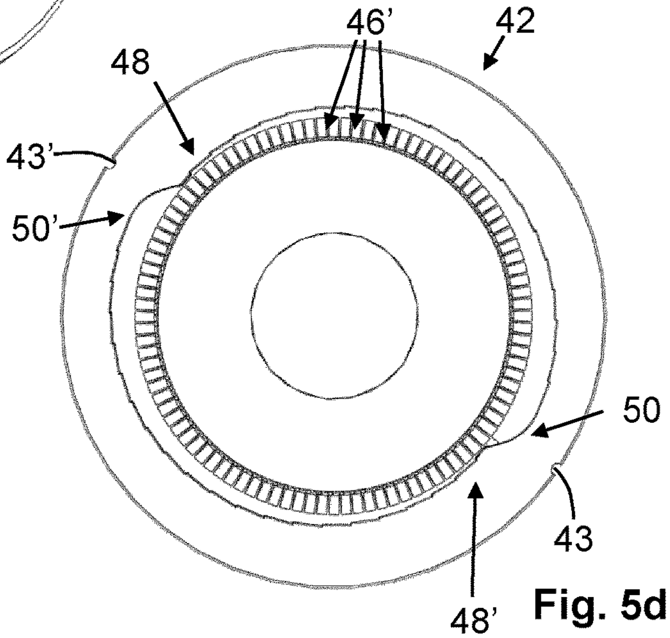

Since the insert 42 is configured for supporting two tubes, the insert 42 comprises two volutes, one volute extending to each tube. The first and second circumferential positions 48', 50' of the second volute are indicated in FIG. 5*d*.

In the embodiments of FIGS. 5*a*-5*d* the inside of the separator comprises both the steps 46, 46' and the volute. In alternative embodiments the inner circumferential surface 44 of the separator rotor may comprise only the volute, or volutes, or only one or two sets of steps 46, 46'. A further alternative may be that the inner circumferential surface 44 comprises the volute, or volutes, and only one of the sets of steps 46, 46'.

Figure 6:
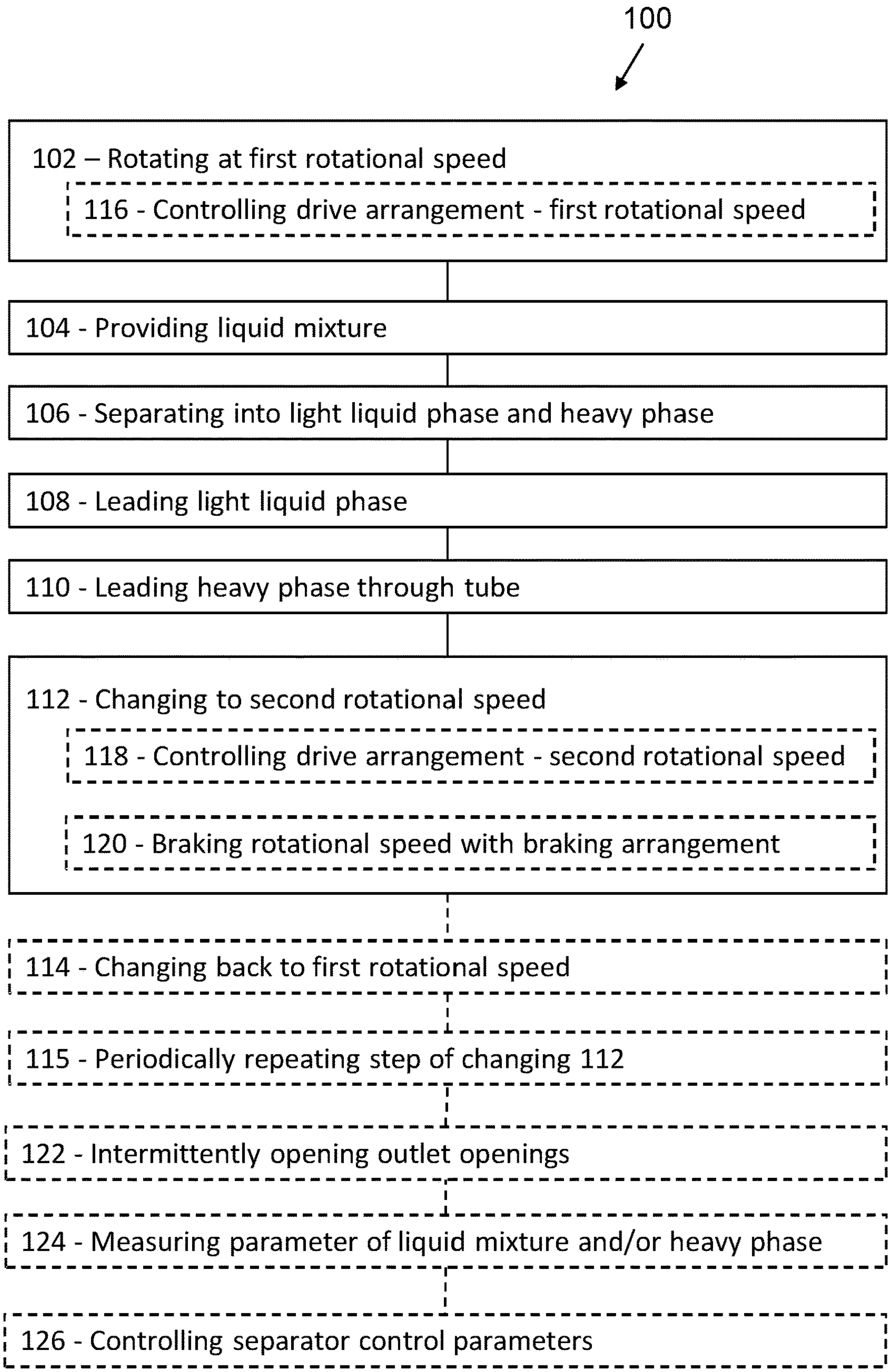
FIG. 6 illustrates a method of controlling a centrifugal separator.

FIG. 6 illustrates a method 100 of controlling a centrifugal separator. The centrifugal separator may be a centrifugal separator 1 as discussed in connection with FIGS. 1, 2, and 4*a*-4*c*. The centrifugal separator may comprise an insert 42 as discussed in connection with FIGS. 5*a*-5*d*.

Accordingly, the centrifugal separator comprises a separator rotor delimiting a separation space, a stack of frustoconical separation discs arranged inside the separation space, a drive arrangement configured to rotate the separator rotor about a rotation axis at a rotational speed, an inlet for a liquid mixture, a first outlet for a light liquid phase arranged in fluid communication with a central portion of the separation space, a second outlet for a heavy phase, and at least one tube extending from at least one radially outer portion of the separation space towards a central portion of the separator rotor. The at least one tube has an outer end arranged at the at least one radially outer portion and an inner end arranged towards the central portion of the separator rotor. The second outlet is arranged in fluid communication with the inner end of the at least one tube.

The rotational speed of a separator rotor of the centrifugal separator 1 may be changed as discussed in connection with FIGS. 3a-3c.

The method 100 comprises steps of:

Rotating 102 the separator rotor at a first rotational speed.

Providing 104 a liquid mixture to the inlet for liquid mixture.

Separating 106 the liquid mixture into at least a light liquid phase and a heavy phase in the separation space inside the separator rotor. The step of separating 106 relies on the rotation of the separator rotor, such as performed during the step of rotating 102 the separator rotor at the first rotational speed mentioned above, and when the separator rotor is rotated at the second rotational speed mentioned in the step of changing 112 the rotational speed mentioned below.

Leading 108 the light liquid phase to the first outlet. Thus, the light liquid phase, separated from the liquid mixture may be lead out of the separator rotor for being further lead out of the centrifugal separator.

Leading 110 the heavy phase through the at least one tube from the outer end of the tube to the second outlet. Thus, the heavy phase may be lead from the radially outer portion of the separation space, i.e. at a periphery of the separation space, out of the separator rotor for being further lead out of the centrifugal separator.

Changing 112 the rotational speed of the separator rotor from the first rotational speed to a second rotational speed, such that a heavy phase accumulation at a periphery of the separation space is displaced in a circumferential direction.

As discussed above, e.g. in connection with FIGS. 3a-3c and FIGS. 4a-4c, the rotational speed change of the separator rotor from the first rotational speed to the second rotational speed causes the heavy phase accumulation at the periphery of the separation space to be displaced in a circumferential direction. Thus, the heavy phase accumulation is displaced from a circumferential position where there is no tube towards the at least one tube such that heavy phase from the heavy phase accumulation may be lead out of the separator rotor via the at least one tube.

The method 100 may comprise a step of:

Changing 114 the rotational speed of the separator rotor from the second rotational speed back to the first rotational speed. Thus, the step of changing 112 the rotational speed from the first rotational speed to the second rotational speed may be repeated. As discussed above with reference to FIG. 3c, the step of changing the rotational speed of the separator rotor from the second rotational speed back to the first rotational speed need not necessarily be performed in one step.

The method 100 may comprise a step of:

Periodically repeating 115 the step of changing the rotational speed of the separator rotor from the first rotational speed to a second rotational speed. Thus, the heavy phase accumulation at the periphery of the separation space is displaced periodically towards the outer end of the at least one tube. Thus, the heavy phase does not form a static mass at the periphery of the separation space, but may be continuously lead out of the separation space via the at least one tube.

The step of changing 112 the rotational speed of the separator rotor from the first rotational speed to the second rotational speed may be performed within a timeframe of 1-60 seconds, or within a timeframe of 1-30 seconds, or within a timeframe of 1-20 seconds, or within a timeframe of 3-15 seconds.

As discussed above, a rotational speed difference between the first rotational speed and the second rotational speed may be at least 50 rpm, or at least 100 rpm.

The step of rotating 102 the separator rotor at a first rotational speed may comprise a step of:

Controlling 116 the drive arrangement to rotate the separator rotor at the first rotational speed, and the step of changing 112 the rotational speed of the separator rotor from the first rotational speed to a second rotational speed may comprise a step of:

Controlling 118 the drive arrangement to rotate the separator rotor at the second rotational speed.

The centrifugal separator may comprise a braking arrangement arranged separate from the drive arrangement and configured to brake the rotational speed of the separator rotor, as discussed above, inter alia with reference to FIG. 1. The step of changing 112 the rotational speed of the separator rotor from the first rotational speed to a second rotational speed may comprise a step of:

Braking 120 the rotational speed of the separator rotor from the first rotational speed to the second rotational speed with the braking arrangement.

The centrifugal separator suitably is a high speed centrifugal separator. Accordingly, the first rotational speed, and/or the second rotational speed, may provide centrifugal separation at 1000 G or more.

The separator rotor may comprise one or more outlet openings at a radially outer periphery of the separator rotor, the outlet openings connecting a radially outer periphery of the separation space with an ambient environment of the separator rotor, as discussed above, inter alia with reference to FIG. 2. The method 100 may comprise a step of:

Intermittently opening 122 the outlet openings.

In order to influence the flow of heavy phase through the at least one tube, one or more separator control parameters may be changed based on at least one parameter of the liquid mixture and/or at least one parameter of the heavy phase. Accordingly, the method 100 may comprise a step of:

Measuring 124 a parameter of the liquid mixture, and/or of the heavy phase, and based on a value of the parameter, performing a step of:

Controlling 126 at least one of the following separator control parameters:

a level of the first rotational speed, a level of the second rotational speed, a time period for repeating the step of changing the rotational speed of the separator rotor from the first rotational speed to the second rotational speed, a time period within which the step of changing the rotational speed of the separator rotor from the first rotational speed to the second rotational speed is performed, and a level of a rotational speed difference between the first rotational speed and the second rotational speed.

The at least one parameter of the liquid mixture and/or of the heavy phase may be e.g. temperature, viscosity, and/or solid matter content.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims. For instance, the controller 12 may be a distributed controller system, i.e. comprising more than one processing unit for controlling different aspects of the centrifugal separator, the rotational speed of the separator rotor 11, measurements being made, the intermittent opening of outlet openings, activating of a braking arrangement 14, 14', etc.

The invention claimed is:

1. A method of controlling a centrifugal separator, the centrifugal separator comprising a separator rotor delimiting a separation space, a stack of frustoconical separation discs arranged inside the separation space, a drive arrangement configured to rotate the separator rotor about a rotation axis at a rotational speed, an inlet for a liquid mixture, a first outlet for a light liquid phase arranged in fluid communication with a central portion of the separation space, a second outlet for a heavy phase, and at least one tube extending from at least one radially outer portion of the separation space towards a central portion of the separator rotor, wherein the at least one tube has an outer end arranged at the radially outer portion and an inner end arranged towards the central portion of the separation space, wherein the second outlet is arranged in fluid communication with the inner end of the at least one tube, and wherein the method comprises steps of:

rotating the separator rotor at a first rotational speed;

providing a liquid mixture to the inlet;

separating the liquid mixture into at least a light liquid phase and a heavy phase in the separation space;

leading the light liquid phase to the first outlet:

leading the heavy phase through the at least one tube from the outer end to the second outlet; and changing the rotational speed of the separator rotor from the first rotational speed to a second rotational speed, such that a heavy phase accumulation at a periphery of the separation space is displaced in a circumferential direction.

2. The method according to claim 1, comprising a step of:

changing the rotational speed of the separator rotor from the second rotational speed back to the first rotational speed or to a third rotational speed.

3. The method according to claim 1, comprising a step of:

periodically repeating the step of changing the rotational speed of the separator rotor from the first rotational speed to the second rotational speed.

4. The method according to claim 1, wherein the step of changing the rotational speed of the separator rotor from the first rotational speed to the second rotational speed is performed within a timeframe of 1-60 seconds, or within a timeframe of 1-30 seconds, or within a timeframe of 1-20 seconds, or within a timeframe of 3-15 seconds.

5. The method according to claim 1, wherein a rotational speed difference between the first rotational speed and the second rotational speed is at least 50 rpm, or at least 100 rpm.

6. The method according to claim 1, wherein the step of rotating the separator rotor at a first rotational speed comprises a step of:

controlling the drive arrangement to rotate the separator rotor at the first rotational speed, and wherein the step of changing the rotational speed of the separator rotor from the first rotational speed to the second rotational speed comprises a step of:

controlling the drive arrangement to rotate the separator rotor at the second rotational speed.

7. The method according to claim 1, wherein the centrifugal separator comprises a braking arrangement arranged separate from the drive arrangement, and configured to brake the rotational speed of the separator rotor, and wherein the step of changing the rotational speed of the separator rotor from the first rotational speed to the second rotational speed comprises a step of:

braking the rotational speed of the separator rotor from the first rotational speed to the second rotational speed with the braking arrangement.

8. The method according to claim 1, wherein the first rotational speed, and/or the second rotational speed, provides centrifugal separation at 1000 G or more.

9. The method according to claim 1, wherein the separator rotor comprises one or more outlet openings at a radially outer periphery of the separator rotor, the outlet openings connecting a radially outer periphery of the separation space with an ambient environment of the separator rotor, and wherein the method comprises a step of:

intermittently opening the outlet openings.

10. The method according to claim 1, comprising a step of:

measuring a parameter of the liquid mixture, and/or of the heavy phase, and based on a value of the parameter, performing a step of:

controlling at least one of:

a level of the first rotational speed, a level of the second rotational speed, a time period for repeating the step of changing the rotational speed of the separator rotor from the first rotational speed to the second rotational speed, a time period within which the step of changing the rotational speed of the separator rotor from the first rotational speed to the second rotational speed is performed, and a level of a rotational speed difference between the first rotational speed and the second rotational speed.

11. A centrifugal separator comprising:

a separator rotor delimiting a separation space;

a stack of frustoconical separation discs arranged inside the separation space;

a drive arrangement configured to rotate the separator rotor about a rotation axis at a rotational speed;

an inlet for a liquid mixture;

a first outlet for a light liquid phase arranged in fluid communication with a central portion of the separation space;

a second outlet for a heavy phase;

at least one tube extending from at least one radially outer portion of the separation space towards a central portion of the separator rotor; and a controller configured to control the drive arrangement, wherein the at least one tube has an outer end arranged at the radially outer portion and an inner end arranged towards the central portion of the separator rotor, wherein the second outlet is arranged in fluid communication with the inner end of the at least one tube, wherein the controller is configured to control the drive arrangement to rotate the separator rotor at a first rotational speed and at a second rotational speed, wherein the controller is configured to change the rotational speed of the separator rotor from the first rotational speed to the second rotational speed, and wherein an inner surface of the separator rotor is provided with one or more steps along a circumferential direction of the separator rotor.

12. The centrifugal separator according to claim 11, wherein the controller is configured to periodically change the rotational speed of the separator rotor from the first rotational speed to the second rotational speed.

13. A centrifugal separator comprising:

a separator rotor delimiting a separation space;

a stack of frustoconical separation discs arranged inside the separation space;

a drive arrangement configured to rotate the separator rotor about a rotation axis at a rotational speed;

an inlet for a liquid mixture;

a first outlet for a light liquid phase arranged in fluid communication with a central portion of the separation space;

a second outlet for a heavy phase;

at least one tube extending from at least one radially outer portion of the separation space towards a central portion of the separator rotor; and a controller configured to control the drive arrangement, wherein the at least one tube has an outer end arranged at the radially outer portion and an inner end arranged towards the central portion of the separator rotor, wherein the second outlet is arranged in fluid communication with the inner end of the at least one tube, wherein the controller is configured to control the drive arrangement to rotate the separator rotor at a first rotational speed and at a second rotational speed, wherein the controller is configured to change the rotational speed of the separator rotor from the first rotational speed to the second rotational speed, and wherein an inner circumferential surface portion of the separator rotor forms a volute extending in a circumferential direction of the separator rotor from a first circumferential position to a second circumferential position, and wherein the outer end of the at least one tube is arranged in the second circumferential position.

14. The centrifugal separator according to claim 11, wherein the at least one tube has an inner diameter within a range of 1.5-10 mm.

15. The method according to claim 2, comprising a step of:

periodically repeating the step of changing the rotational speed of the separator rotor from the first rotational speed to the second rotational speed.

16. The method according to claim 2, wherein the step of changing the rotational speed of the separator rotor from the first rotational speed to the second rotational speed is performed within a timeframe of 1-60 seconds, or within a timeframe of 1-30 seconds, or within a timeframe of 1-20 seconds, or within a timeframe of 3-15 seconds.

17. The method according to claim 3, wherein the step of changing the rotational speed of the separator rotor from the first rotational speed to the second rotational speed is performed within a timeframe of 1-60 seconds, or within a timeframe of 1-30 seconds, or within a timeframe of 1-20 seconds, or within a timeframe of 3-15 seconds.

18. The method according to claim 2, wherein a rotational speed difference between the first rotational speed and the second rotational speed is at least 50 rpm, or at least 100 rpm.

19. The method according to claim 3, wherein a rotational speed difference between the first rotational speed and the second rotational speed is at least 50 rpm, or at least 100 rpm.

* * * * *